Nov. 14, 1961  R. L. BRUNSING ET AL  3,008,838
METHOD OF COOLING FRUIT AND VEGETABLE PRODUCTS
Filed April 27, 1954
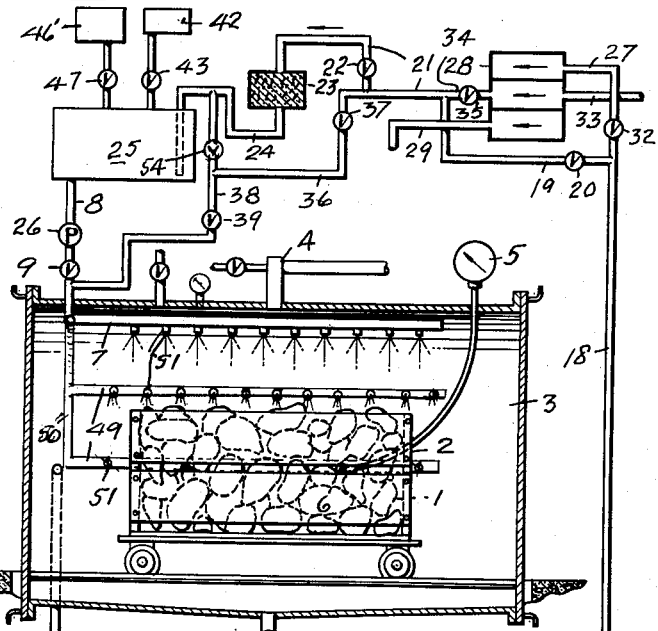
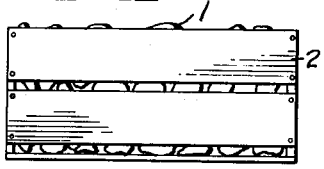
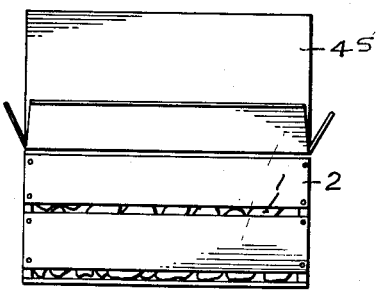
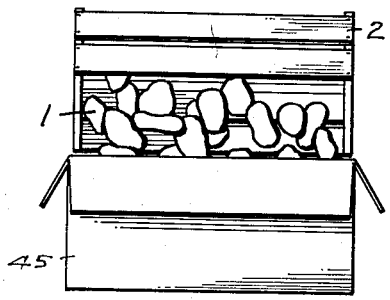
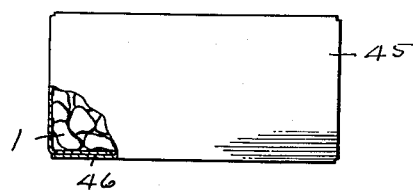
INVENTORS
REX L. BRUNSING
WELLS A. WEBB
BY
ATTORNEYS

3,008,838
METHOD OF COOLING FRUIT AND VEGETABLE PRODUCTS

Rex Louis Brunsing and Wells A. Webb, San Francisco, Calif., assignors, by mesne assignments, to Western Vegetable Industries, Inc., Salinas, Calif., a corporation of California
Filed Apr. 27, 1954, Ser. No. 425,892
10 Claims. (Cl. 99—193)

This invention relates to the vacuum cooling of fruit and vegetable products that cannot be cooled satisfactorily by natural occuring surface moisture for the reason the surface area is too low to carry enough natural occuring surface moisture to more than cool the outermost layer before it is completely evaporated, leaving the interiors of the products unaffected. Apples, avocados, apricots, beans, beets, carrots, cauliflower, citrus fruits, cucumbers, egg plant, grapes, melons, onions, pears, peas, peaches, peppers, persimmons, potatoes, radishes, squash, turnips, yams and zucchini are examples of such products. Of course these examples are considered in their whole, fresh state.

One of the objects of this invention is a method of safely cooling products, such as above described, by what is known as the vacuum cooling procedure, so that they will be cooled throughout the body of each product to the desired temperature, which temperature is substantially lower than atmospheric temperature, and an additional object is the provision of such method in which the time required to perform the uniform cooling is within a practical limit.

Another object of the invention is the provision of an economical method of cooling fruit and vegetable products of the general kind and character hereinbefore described, by what is known as the vacuum cooling procedure, and which products when so cooled are in a dry surface condition for packing in cartons, that has heretofore been impossible where icing or where a forced draft of humid air has been resorted to for cooling the products.

A still further object of the invention is the provision of a method for cooling fruit and vegetable products by what is known as the vacuum cooling procedure, in which surface moisture is provided during the vacuum cooling step in such a manner as to uniformly cool the body of each fruit or vegetable product throughout, but which bodies, after being so cooled, are dry on their surfaces, but unaffected insofar as their interior moisture content is concerned.

In further explanation of this invention, it should be noted that some products, if uniformly cooled throughout to say about 40° F., would be adequately cooled for keeping purposes in storage and in travel, while other products should be cooled to about 32° F. to insure against possible deterioration during the time when they are to be stored or to be moved from one place to another, and say during the period of time they may normally be held before being sold.

The following examples are of some products, and approximate Fahrenheit temperature to which they should be cooled and kept to be satisfactorily held without material deterioration:

| | |
|---|---|
| Lemons | 55° to 58° |
| Bananas | 56° |
| Pumpkins, squash, tomatoes | 50° to 55° |
| Potatoes, egg plant, cucumbers | 45° to 50° |
| Grapefruit | 40° to 55° |
| Pineapples avocados | 40° to 45° |
| Honeydew, casaba, Persian melons | 36° to 40° |
| Oranges, coconuts | 32° to 37.5° |
| Cantaloupes | 32° to 34° |
| Peaches, apples, apricots, cherries, quinces, plums, grapes | 31° to 32° |
| Pears | 29° to 31° |
| Asparagus, green beans, lima beans, beets, sweet corn, broccoli, carrots, turnips, onions, leeks, cauliflower, watermelons, parsnips, radishes, rhubarb | 32° |

The products that are to be cooled by the method hereinafter described may be of the type earlier described herein, and in this connection, it should be pointed out that the problem of cooling such products by the vacuum cooling method principally resides in the fact that the products do not have natural free moisture on their outer surfaces, or do not have a sufficient amount of such free moisture to uniformly cool the interior mass to the desired degree when such moisture is evaporated under the proper conditions to efficiently reduce the temperature to said degree were sufficient moisture present. Where all vaporizable moisture has left the surface before satisfactory cooling has occured, it is obvious that no useful result has been obtained.

Some products, notably onions, grapes and oranges, are oily skinned or possess some other moisture repellant that causes the water to run off immediately. Other objects such as roots, potatoes, carrots etc., do not have such a repellant, but all have the problem in common that, even were the products first dipped in water, and were this water to adhere to their outer surfaces, it would be evaporated under the most favorable conditions for vacuum cooling, long before the products were cooled throughout to any appreciable degree.

In the present method, let it be assumed that the products to be cooled are potatoes.

By the present method virtually any fruit or vegetable product may be cooled to the freezing point of the moisture within such fruit or vegetable, and even lower, if desired, and to any temperature above such freezing point and below atmospheric temperature. This method accomplishes this result without drying out the products, and yet the products do not carry surface moisture that would prevent their being packed in cartons.

The drawings diagrammatically illustrate the method and in the drawings:

FIG. 1 shows a conventional wooden box or crate such as may be used in the field for holding the fruit or vegetable products to be cooled.

FIG. 2 shows such box or crate in a vacuum chamber that is equipped with conventional doors at the ends for opening and closing the same through which ends the container of FIG. 1 may be admitted and withdrawn, also suitable means is indicated for conducting liquid into the chamber and for spraying the produce during the time air is being exhausted.

FIG. 3 shows the box of FIG. 1 after withdrawal from the vacuum chamber and with a carton inverted over the open top of the box for transfer of the produce in said box upon inversion of the carton and box as a unit.

FIG. 4 shows the carton in a position with the produce of the box of FIG. 1 therein and FIG. 5 shows the carton closed and sealed and ready for shipment or storage.

Referring to the drawings, the products 1, which may be potatoes (diagrammatically shown), are harvested in the field and may be placed in wooden crates or containers 2, the bottoms of which are not tight, nor are the bottoms tight with the sides, but have adequate cracks or openings for drainage of water therefrom. The containers 2, so filled, have open tops and are placed in a vacuum chamber 3 that is closed, and which chamber is provided with the usual means, such as a valve controlled steam ejection jet 4 for evacuating air and moisture of evaporation from within the tank or tube 3. Also the other conventional controls such as a thermometer 6 within the tube 3 connected with a Bourdon gauge 5 outside the tube, may be provided. In addition one or more spray pipes 7 may extend over the crate 2 when the latter is in said vacuum chamber, which pipe extends through a wall of the tube 3 for connection with a source of water to be conducted thereto through a pipe 8 outside the tube. This pipe 8 will have a suitable valve 9 for controlling the flow of liquid to the spray pipe.

A drain or discharge pipe 10 extends from the bottom of tank 3 into a closed tank 11, which may be a settling tank, and tank 11 is provided with a drain 12, having a valve 13, and the bottom of the tank 11 may slope to the drain 12 to permit draining sediment therefrom.

A pipe 15 extends from the top of tank 11 to a point above the bottom of tank 3 where said pipe opens into the latter tank so as to permit vapors in tank 11 to pass into tank 3 and to equalize the vapor pressures in tanks 3, 11.

A pipe 16 extends from the bottom of tank 11, and a pump 17 in pipe line 16, preferably below the water level in tank 11, will function to pump water from tank 11 into pipe 18.

Said pipe 18 connects with a pipe 19 having a valve 20 therein, and pipe 19, in turn, connects with a pipe 21 that has a valve 22 therein. The pipe 21 connects with a filter 23, and a pipe 24 extends from filter 23 to tank 25. The tank 25 is the one that supplies water to pipe 8, and a pump 26 may be in pipe 8 if desired, although it will be seen that when there is a partial vacuum in tank 3 the water will normally be drawn into the sprinkler for ejection into the tank 3, and in any event pump 17 may pump the water to tank 25 and the latter may be elevated above the tank 3 to provide additional pressure.

Instead of the closed circulating system above described, the valve 20 in pipe 19 may be closed and the water from pipe 19 passed through a pipe 27 that connects pipe 18 with a heat exchanger 28. From said heat exchanger the water may be exhausted through a pipe 29, and a valve 32 may be in pipe 27 to close said pipe to flow of water therethrough when the circulating system that includes pipe 19 is used.

Fresh water may be passed through the heat exchanger 28 from a pipe 33 to be cooled by the water from pipe 18, and this fresh water is then conducted from the heat exchanger through a pipe 34 having a valve 35 therein to pipe 21. However, a bypass pipe 36 having a valve 37 therein connects with pipe 21 ahead of valve 22 in pipe 21 so that the fresh cooled water will bypass the filter 23. This pipe 36 may connect with pipe 24 at a point in the latter between the filter and tank 25 for conduction to the latter tank, or a branch pipe 38 may connect pipe 36 directly with pipe 8 at a point outside tank 3 and between the sprinkler 7 and valve 9 so that this fresh cooled water can be used as a rinse, as will later be described. A valve 39 is in pipe 38 to close this line if and when desired.

Inasmuch as certain fruit and vegetables may be infected with fungi, spores, bacteria, etc., that would contaminate the water supply, and that would cause spoilage of the products, if not inhibited, it is desirable that a non-toxic and non-caustic fungicide and germicide, suitable for inhibiting the growth of such fungi and other undesirable organisms be added to the water. A one to about a ten percent solution of sodium hypochlorite may be added to the water in an amount to produce substantially 100 parts per million effective chlorine concentration and a pH of from about 8.0 to 8.5. Another effective fungicide and germicide is chloramine which may be added to produce the above chlorine concentration. These are merely mentioned as several fungicides, and others may be used provided they are not toxic or caustic and do not have a corrosive effect on the tank, pipes, pump, etc., in the concentration used.

Where the water is directly recirculated the filtering of the same is highly desirable since impurities that are washed from the produce being cooled should be removed from the water. In this way the cooling water also cleans the produce.

The fungicidal and germicidal solution may be introduced into tank 25 from a source of supply 42, and the flow into said tank 25 may be regulated by a valve 43 or by any other suitable means that will insure the proper amount of said solution being in the water.

The use of the word "water" in the claims is not intended to restrict the invention so claimed to water alone, but is intended to cover water containing an effective fungicide, germicide, and foaming or wetting agent.

Water in tank 11 and pipe 18 will, of course, prevent breaking the vacuum in the tank 3 while the water is being withdrawn from said tank.

Where water from pipes 33, 36, 24 is being used, the valve 43 may represent any of the conventional control means employed to maintain a satisfactory amount of the fungicidal solution in the water that is ejected from the sprinklers. The arrangement for rinsing the products has been already mentioned, should such a rinse be desired.

The thermometer 6 may be placed within the container 2 in contact with some of the potatoes, if desired. No attempt is made herein to claim any particular controls for temperature or pressure within the tube, since these are common in vacuum tubes or tanks for whatever purpose is desired.

After the potatoes from the field have been placed in the tube 3 having a temperature of substantially 64° F. and a high vacuum of substantially 29.80 to 29.95 has been established within said tube, there will be no appreciable cooling effect on the potatoes irrespective of how long they remain in the tank at the absolute pressure such a vacuum would produce. However, upon opening valve 9 in line 8 to admit water to the spray pipe or pipes 7 so that the potatoes receive a surface wetting from the spray, which spray may be left on for say a minute, and then discontinued, the temperature of the potatoes will quickly drop to around 42° F. within the next ten minutes during which time the vacuum is maintained and the moisture of evaporation is withdrawn. After the surface moisture has been evaporated, the temperature of the potatoes will be stabilized, and will be equalized in the potatoes, and with each additional wetting, the temperature of the potatoes may be lowered to 32° F. or even below freezing, if desired, which is not normally the case. When the thermometer indicates that a temperature of about 32° F. has been reached, the absolute pressure within the tank may be fixed at .0887 lb. per square inch so that freezing will be avoided, and as soon as the temperature within the bodies of the potatoes has been equalized and their outer surfaces are dry, atmospheric air is admitted into the tube 3 and the latter is opened. The potatoes may then be put into sacks or cartons 45. If in cartons, as illustrated, and the latter are sealed, as at 46, the potatoes will absorb heat relatively slowly due to the heat insulating characteristics of the carton walls. Also the packing in cartons is possible since the potatoes are dry, and where any potatoes may have had natural spots of moisture that may have developed into rot or mold, such spots are dried by the cooling process.

While the free surface water is normally evaporated from the products that are cooled, without drying the products themselves, it is not necessary that some products be dry, unless they are to be packed in cartons. Such products, and potatoes are one of them, may be packed in burlap or open mesh twine bags before going into the tank 3, and, after cooling, they can be stored or placed in a car for shipment without repacking and without fully removing all surface moisture. Obviously crates or the like, instead of bags can also be used, and repacking can be eliminated and the crated produce placed in storage or shipped with or without removing all surface moisture, according to the character of the product.

The cooling of the potatoes under the foregoing conditions where only water is used, may take from one to two hours. In some instances, starting with dry potatoes at 64° F. and a wet bulb temperature within tube 3 of 19° F. and a vacuum of 29.87 inches and the weight of the individual potatoes being between three to four ounces, it required about 156 minutes to reduce the potatoes to an equalized temperature of 34° F., the vacuum, at times, being as high as 29.95, but a suitable non-freezing solvent would be used here.

Under similar circumstances, where a foaming or wetting agent, such as a very small amount of sodium alkylaryl sulfonate (about 0.1%) by weight, was added to the water, potatoes having a starting temperature of around 70° F. may be lowered in temperature to substantially 34° F. within approximately one hour, and by circulating the same water, or water and foaming agent, the times given above may be further reduced.

From the foregoing, it will be seen that, with products such as potatoes and others that do not have a water repellant surface characteristic, the vacuum cooling of such products to around 32° F. may be accomplished by wetting the products while in the vacuum chamber and during the evaporating step. This should be a spray since the closer to the outer surfaces of the products the evaporation is caused to occur, the greater the cooling efficiency. The maximum efficiency occurs at the drying stage when the film is extremely thin.

The addition of the foaming agent is seen to materially increase the cooling efficiency of the method and consequently its practicability.

In the case of oranges and other products that have a water repellant outer surface, the employment of the wetting or foaming agent is of great assistance where less than a torrent is used.

Where large or small quantities of water have been tried, or even water in the form of a spray (with oranges and the like in particular) the water tends to collect in rivulets and to run downwardly over the products in narrow spaced paths. But with the addition of a foaming agent, foam membranes of moisture would form on the surfaces of the oranges and potatoes wetting substantially all of their surfaces with a thin layer of water. The oranges, potatoes or other objects so moistened, are quickly dried free of froth and moisture at the end of the cooling operation.

Inasmuch as provision is made for rinsing the products within tank 3 with either clear water or with water containing the fungicide or germicide, many different foaming agents may be used, although, as already stated, an edible foaming agent is preferable. Examples of some foaming agents are as follows:

| | Oz. |
|---|---|
| Saponin | 16 |
| Glycerine | 64 |
| Water | 64 |

The above constitutes a syrup and one ounce of said syrup to each 15 gallons of water will provide a suitable frothing solution.

About 225 ounces of soap and 20 ounces of saponin to each 10 gallons of soft water will produce a suitable solution, or 30 parts of trihydroxy ethylamine oleate to 200 parts of glycerine and 1000 parts of water will also serve. Soft soap and starch is another frothing agent, or soap alone, or 181 parts alkylated sulfonated mineral oil and 2 parts urea in the ratio of 1 lb. of said oil and urea to 800 lbs. of water would produce a frothing solution. Obviously it would be desirable where soap or detergents are used to rinse the products before removal from the tank 3. Other formulas may be used provided the result insures a covering layer of water on products that have a water repellant surface, such as oranges, melons, avocados, etc.

The foaming agent may be introduced into container 25 from a source of supply 46' and a control valve or means 47 is provided to regulate the amount so introduced.

From the foregoing, it is seen that avocadoes, melons, and many other products heretofore cooled solely by the conventional methods of refrigeration, may be quickly, safely, and efficiently cooled to any desired degree by the method herein disclosed. By controlling the absolute pressure within the tube 3 so it does not go below .0887 lb. per square inch, freezing can be avoided, yet the temperature can be reduced to 32° F. Since the temperature of the products will be lowest at their outer surface, this temperature can readily be kept to a safe limit, as the temperature within the products equalizes itself.

While the description and claims refer to the method as applied to fruit and vegetable products it is to be understood that the invention is intended to cover the use of the method in connection with any products that may be cooled by use of the invention, and insofar as the fruit and vegetable products are concerned, the method finds one of its principal adaptations in precooling such fruit and vegetable products for shipment or storage.

This precooling step removes the field heat, and thereafter the products are usually either placed in cold storage space or in refrigerator cars.

Where intermittent wetting is adopted, the reduction in temperature may be in controlled stages. The vacuum preferably will be such as to produce not less than .0887 lb. per square inch absolute pressure within the vacuum chamber, so as to insure against freezing, and the intervals between wetting of the products, and when they are dry, will be periods when the temperature within the products is equalized. Ultimately the temperature will be uniform at the desired degree.

With the use of a foaming agent, the cooling efficiency is normally greater than the efficiency where water alone is used, and, as already stated, the recirculation of the water, or water and frothing agent, materially increases the efficiency of the cooling step.

The fact that most products are thoroughly dried in the vacuum chamber or tube, insofar as surface moisture is concerned, enables them to be packed in cartons, and once the cold products are placed within the carton and the latter is closed, the heat insulating properties of the carton will function to keep the air in the interiors of the cartons, as well as the products themselves, at a reduced temperature for a substantially longer period of time than where crates or wooden boxes are used.

As already explained, where the products are not packed in cartons and where they are not detrimentally effected by residual surface moisture, the drying step is not absolutely essential.

Earlier in this description mention was made of permitting the temperature of the products being cooled to equalize in the vacuum chamber.

In actual practice, it is not desirable to tie up operations of the vacuum tube any longer than possible, hence the skin or outer layer of the product being cooled may be reduced, by the application of water and evaporation thereof, to say 32° F. from an initial temperature of about 70° F., at which time the interior temperature may be reduced to only about 50° F. If the keeping or shipping temperature desired is around 40° F., then by placing the product in a refrigerated space, outside the vacuum tube, of approximately 40° F., the temperature of the product will be equalized at about 40° F. within a relatively short time of say one to two hours.

To accomplish the above result by merely placing the product in a refrigerated atmosphere of 40° F. would take about 24 hours, and if the products were in sealed cartons it would take 10 days or longer, where a load of many cartons are cooled.

The volume of the product will, of course, determine the depth to which the outer layer should be cooled to the lowered temperature in order to enable equalization of the temperature after removal from the vacuum chamber, and the temperature of the refrigerated atmosphere within which the product is placed for equalization would normally be at about the temperature of equalization.

In the examples, earlier given, of the keeping temperatures of different products, it is to be understood that lower temperatures, but above a freezing temperature, may be used where no harm would result by such lowered temperatures. Some products, such as bananas and tomatoes are hurt by temperatures that vary too greatly below those given, even where the temperature is above freezing. On the other hand, in many instances, the temperatures given are considered the ideal temperatures for long keeping, but if the products are to be kept for relatively short periods of time, the keeping or equalized temperatures can be much higher. Cantaloupes, for instance will keep well at about 50° F. for the time that would be required to pick or harvest them and get them to distant markets in conventional refrigeration cars, but for long periods of time, the lower temperature should be used. It should be added that the absolute pressures given in the examples are the pressures that would be required in the vacuum chamber to produce the temperature range given in each instance due to the evaporation of the water.

In instances where the products may have their temperatures reduced to below the freezing point, a solvent, such as salt, for example, may be added to the water to prevent freezing the water in the sprinkler and on the produce.

In the case of potatoes, where there is quite a variation in the size of the potatoes, it may happen that the smaller ones may be reduced to the heart to say 40° F. while the larger ones may be cooled to say 40° F., in the outer layer only. By discontinuing the water spray and increasing the vacuum or lowering the absolute pressure to say .088 lb. per square inch, all of the potatoes will be dried but since the smaller ones dry slower than the larger ones, they may be cooled to the heart to 32° F. by the time they are dry, and immediately thereafter the vacuum is broken and the potatoes or other product having similar variations in size may be removed and placed in the refrigerated atmosphere of the desired temperature to result in equalization of the temperature to the desired degree.

Needless to say the crates that are initially loaded and placed in the vacuum chamber can be shipped to the ultimate destination without disturbing the load, and the transfer to cartons can take place at a point quite distant from the vacuum tube. The crate, of course, must be one that will not be damaged by the water, and one that will not hold water, but from which the water will drain. It need not be open to any greater degree than is necessary for draining water therefrom and for admitting the spray water to efficiently wet the products and for exit of vapors.

While the pipes for introducing water into the vacuum tube are called "spray pipes," it is to be understood that this term is not intended to restrict the invention to any particular size of spray. The pipe or pipes may virtually flood the produce in instances where a foaming agent is not used, and the amount of water should be adequate in such instances to cover the products. If and when net sacks or quite open crates are used, other pipes, as at 49 may direct the water downwardly and also somewhat laterally against the produce, if desired, and intercepting streams or sprays will tend to retard a quick run off of water or the formation of the rivulets hereinbefore mentioned.

The pipes 7, 49 may be any number desired, and may connect with a header 50 that is arcuately extending so as not to interfere with the admission of a load into tank 3, or its removal therefrom. Also, the sprinkler heads or nozzles 51 may in some instances be mechanically movable or movable under the influence of the water passing therethrough to insure against possible blind or dead spots in the load that might not otherwise be adequately wetted. The lower of pipes 49 have their discharge nozzles or openings directed laterally, or they may be directed slightly upwardly, should they be below the level of the load. Also moving spray heads may be used for intermittent wetting without stopping the discharge of water from the nozzles.

In the description, it has been pointed out that the temperature in the tube 1 may be caused to go below 32° F. and where this condition is desirable, the absolute pressure would depend upon the vapor pressure of the salt water, which, in turn, is dependent upon the amount of salt that has been added to the water. For example, even a wetting agent in a measurable amount will lower the freezing point of the water, so the figure .0887 lb. per square inch as indicating the absolute pressure just above the freezing point, is subject to some variation. The precise figure .0887 lb. per square inch is based upon pure water only, hence where said figure is used it is not intended to be considered restrictive, but is intended to be illustrative of a condition that exists where the water is pure, and to include pressures in which a similar condition of non-freezing exists with water that has salt or a solvent added to lower the freezing point.

Where the absolute pressure in tank 1 is .092 lb. per square inch the temperature of the produce may be lowered to 33° F. and will not go lower. At an absolute pressure of .096 lb. per square inch, the temperature will be reduced to 34° F. and at .15 lb. per square inch the temperature will be reduced to 46° F. Thus where, for example, the product is one that will keep satisfactorily during shipment and until sold in the normal channels at 50° F. by reducing the absolute pressure in the tank to .178 lb. per square inch, the temperature will not go lower due to the evaporation of water.

From a practical standpoint, as has been explained, the absolute pressure is usually lowered to substantially .08 lb. per square inch in order to expedite cooling of the product, since by cooling the other layers of the products to this degree, where, for instance, the keeping temperature is say 45° F., the temperature of the product, to its center, may well equalize to 45° F. even though prior to the surface cooling it was at a substantially higher temperature.

Mention has also been made of the fact that the drying of the surfaces of products is desirable where the products are to be packed in cartons. The degree of this dryness is such that the cartons will not be materially weakened, hence, bone dryness or the equivalent is not absolutely necessary, and this is particularly so where the cartons are packed in low stacks so that there is no excessive weight on the lower cartons in the stacks. The term "dry" is to be interpreted in the light of the practical result, for the reason that some dampness may exist in certain instances, and also some cartons may be waterproofed or otherwise treated to resist weakening from contact with water. Preferably, however, the dampness should not be so great as to have free water run off the products or to accumulate, by gravity, below the products to form drops that would soak into the cartons.

While some frothing agents may be somewhat toxic if present in large amounts, the word non-toxic as may be used in this description refers to substances that may be strictly non-toxic or that may be non-toxic in the amount that would remain on the products treated after the cooling step is completed and the products are shipped or are stored for shipment.

It is, of course, obvious that the water supply in tank 25 may be replenished at any time from pipe 33 by closing valves 37 and valve 54, said latter valve being in the line 36 between the juncture of pipe 38 with pipe 36 and the point at which the latter connects with pipe 24; or if the added water is not to be filtered, valves 22, 39 may be closed and valves 37, 54 opened. Such replenishment is necessary to replace the moisture of evaporation.

The word "deteriorate" as used herein and in the claims, is intended to mean such a loss in quality as to cause the products to be below the standard for the grade of the product when packed. Thus, while deterioration to some degree normally commences with the harvesting of most products, such products should reach the final market without sufficient deterioration to cause them to be sub-standard.

Heretofore, for example, cantaloupes shipped from El Centro, California, to New York and cooled in the conventional method by use of ice, must be shipped relatively green and hence of a lower grade than the ripened cantaloupes which would not heretofore keep during this trip. The present method of cooling enables the higher grade ripened cantaloupes to be shipped the longer distances, and to arrive in excellent condition with no deterioration.

We claim:

1. The method of preparing fruit and vegetable products for shipment where such products are at atmospheric temperature substantially above freezing and must be reduced to a uniform keeping temperature below said atmospheric temperature and above freezing for shipment, comprising the steps of: evaporating free moisture from the outer surfaces of said products under an absolute pressure between 0.08 and 0.015 lb. per square inch to lower the temperature of the outer layers of said products to a temperature above their freezing point and below said keeping temperature and continuing said evaporation at said absolute pressure until the outer layers of said products are at said temperature below said keeping temperature, then placing said products in a refrigerated space at atmospheric pressure and at said keeping temperature and holding them in said space until the temperature throughout the bodies of said products is equalized at said keeping temperature.

2. The method of preparing fruit and vegetable products for shipment where such products are at an atmospheric temperature substantially above freezing and must be reduced to a uniform keeping temperature below said atmospheric temperature and above freezing that comprises the steps of: wetting the outer surfaces of said products with water in an abolute pressure below that at which the evaporation of said water on said surfaces will produce a temperature below said keeping temperature and above the freezing point of said products and holding said products at said absolute pressure until the outer layers of said products are cooled to said temperature below said keeping temperature but above said freezing point, discontinuing the wetting of said surfaces and then holding said products in atmospheric pressure at said keeping temperature until the temperature throughout the bodies of said products is equalized at said keeping temperature.

3. Apparatus for vacuum cooling fruit and vegetable products and for preparing them for shipment comprising: a tank for said products, spray nozzles for water opening into said tank for discharge of water onto said products for cleaning the latter and for wetting them, a conduit communicating between the bottom of said tank inside the latter and said spray nozzles for circulation of water from said bottom to said nozzles, a filter in said conduit for filtering impurities washed from said products, means for closing said tank to ingress of air into the same, means communicating with the interior of said tank for evacuating the air therefrom and for withdrawal of the vapors of evaporation from products within said tank that are wetted by said water, and means connected with said conduit for replenishing water lost through evaporation and the removal of said vapors of evaporation.

4. Apparatus for vacuum cooling fruit and vegetable products and for preparing them for shipment comprising: a tank for said products having side walls and a top, water discharge nozzles along said side walls and said top directed generally toward the products adapted to be positioned in said tank, a drain opening formed in the bottom of said tank, a conduit connecting said discharge nozzles with said drain opening, means communicating with the interior of said tank for evacuating the air and vapors of evaporation from within said tank and for inducing discharge of water into said tank through said discharge nozzles and means in said conduit for withdrawing liquid from said tank against the force of vacuum within the latter and for maintaining an air seal in said conduit.

5. The method of preparing fruit and vegetable products for shipment, said method comprising the steps of: placing said products at substantially atmospheric temperature within an enclosed space; evacuating air in said space until the absolute pressure therein is within the range of approximately 0.08 and 0.15 lb. per square inch; wetting the surface of said products for a length of time sufficient to cause the temperature of said products to fall below atmospheric but to remain above the freezing temperature thereof; rapidly increasing the pressure within said space until it is substantially at atmospheric pressure; and then removing said products from said space.

6. The method of preparing fruit and vegetable products for shipment, said method comprising the steps of: placing said products at substantially atmospheric temperature within an enclosed space; evacuating air in said space until the absolute pressure therein is within the range of approximately 0.08 and 0.15 lb. per square inch; intermittently spraying the surface of said products with water until they are at a temperature below atmospheric temperature but above the freezing temperature thereof; rapidly increasing the pressure in said space until it is substantially at atmospheric pressure; and then removing said products from said space.

7. Apparatus for vacuum cooling fruit and vegetable products, said apparatus comprising: a vacuum tank having an open end through which products may be placed in said tank; a closure for said open end; means for evacuating air from within said tank; discharge means for distributing water over said products; collection means for collecting water distributed over said products; conduit means connected between said collection means and said discharge means; and power means in said conduit means for recirculating said water through said conduit means and outwardly through said discharge means for redischarging the said water over said products, whereby the necessity of pressurizing said water at said collection means is made unnecessary when said tank is evacuated.

8. Apparatus for vacuum cooling fruit and vegetable products comprising: a tank within which said products are adapted to be positioned having a loading opening for admitting said products into said tank and a closure for said opening, a plurality of water conduits respectively having discharge openings opening into said tank for discharging water onto products within said tank, means for ejecting said water into said tank and onto said products including a source of water outside said tank connected with said conduits and under a pressure no less than atmospheric pressure and an air evacuating device communicating with the interior of said tank adapted to reduce the pressure in the latter to substantially .08 lb. per square inch, and means for collecting and recirculating said water through said ejecting means, said ejecting means and said recirculating means forming a closed system with said tank.

9. The method of preparing fruit and vegetable products for shipment that comprises the steps of: placing said products within an enclosed space, evacuating air from within said space until the absolute air pressure therein is within the range of approximately .08 lb. per square inch to .15 lb. per square inch, wetting the surfaces of said products with water containing a wetting agent to cause such water to substantially coat the entire surface of each product, maintaining said surfaces covered with said water, and maintaining said pressure for a total time sufficient to reduce the temperature of the outer layer of each product to a temperature below atmospheric temperature but above the freezing temperature of said products.

10. The method of cooling fruit and vegetable products that comprises the steps of: placing said products within an enclosed space, evacuating air from within said space until the absolute air pressure therein is approximately .08 lb. per square inch, wetting the surfaces of said products with water containing a non-toxic frothing agent whereby such water will substantially coat the entire surface of each product, maintaining said surfaces covered with said water, and maintaining said pressure for a total time sufficient to reduce the temperature of each product to a temperature substantially below that at which said products will deteriorate at atmospheric pressure but above the freezing temperature of said products.

References Cited in the file of this patent

UNITED STATES PATENTS

| | | |
|---|---|---|
| 1,884,429 | Warner | Oct. 25, 1932 |
| 2,103,542 | Mart | Dec. 28, 1937 |
| 2,131,131 | Zarotschenzeff | Sept. 27, 1938 |
| 2,153,452 | Brown | Apr. 4, 1939 |
| 2,285,331 | Doyle | June 2, 1942 |
| 2,684,907 | Brunsing | July 27, 1954 |

OTHER REFERENCES

The Refrigeration Journal: October 1953, pp. 10, 12, 14, 16 and 17, article entitled "Evaporative Cooling of Fruits and Vegetables."